United States Patent

Jagatic

[15] 3,683,231

[45] Aug. 8, 1972

[54] CENTERING CIRCUIT FOR TELEVISION RECEIVERS

[72] Inventor: Nikola Jagatic, Arlington Heights, Ill.

[73] Assignee: Zenith Radio Corporation, Chicago, Ill.

[22] Filed: July 30, 1970

[21] Appl. No.: 59,497

[52] U.S. Cl. ....................315/26, 315/24, 315/27

[51] Int. Cl. ....................H01j 29/70

[58] Field of Search ....................315/24, 27, 26

[56] References Cited

UNITED STATES PATENTS 2,905,856 9/1959 Schlesinger....................315/27

3,489,948 1/1970 Buechel....................315/27

OTHER PUBLICATIONS

Encyclopedia on Cathode-Ray Oscilloscopes and Their Uses, January, 1959.

*Primary Examiner*—Benjamin A. Borchelt
*Assistant Examiner*—S. C. Buczinski
*Attorney*—Francis W. Crotty and Cornelius J. O'Connor

[57] ABSTRACT

A raster centering circuit for a television receiver, in which the signal developed across a tuning circuit associated with a tunable sweep output transformer is rectified to provide the DC centering current.

9 Claims, 1 Drawing Figure

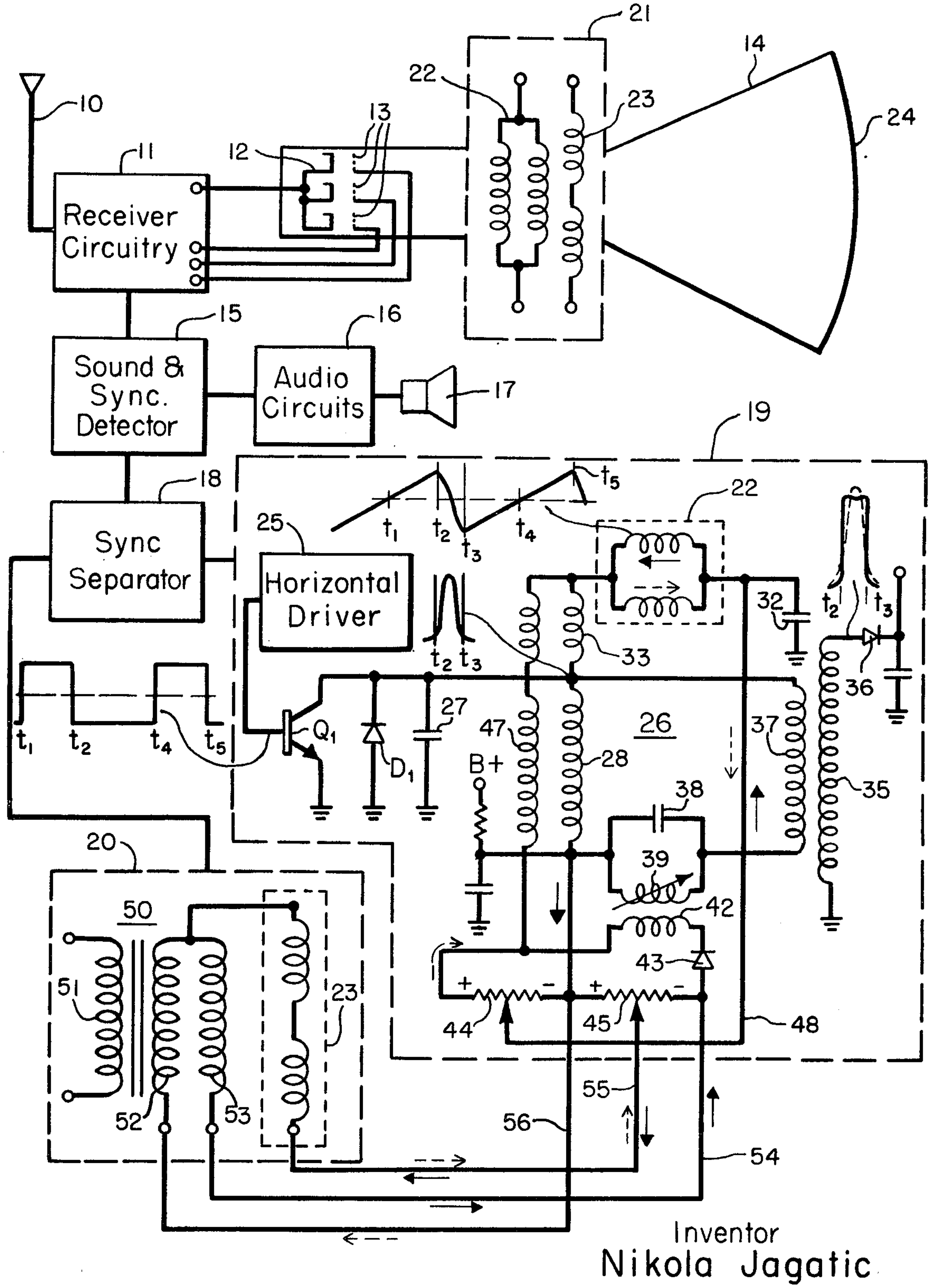
Inventor
Nikola Jagatic
By Cornelius J. O'Connor
Attorney

CENTERING CIRCUIT FOR TELEVISION RECEIVERS

BACKGROUND OF THE INVENTION

This invention relates in general to a deflection system for a television receiver and in particular to a circuit for centering the raster developed on the display screen of a television image reproducer.

In a monochrome television receiver the position of the raster on the screen of the cathode-ray tube is conveniently adjustable by a pair of ring magnets which are rotatably supported on the neck of the tube. In such an arrangement the path of the scanning beam, and thus the position of the raster, is determined by the resultant field of the adjustable magnets. However, in a color television receiver magnets cannot be employed for centering since they would adversely affect purity of the reconstituted image.

A common practice for achieving raster centering in color television receivers is to employ a pair of centering circuits which independently derive and apply respective DC currents to the horizontal and vertical deflection windings. This DC current is ordinarily obtained by rectifying the scanning portion of the horizontal sweep signal. This practice has the advantage of rendering the centering circuit independent of changes in brightness which is not the case when the DC centering current is acquired from the B+ supply. However, since a centering current derived from the horizontal deflection signal has a ripple rate related to the frequency of the horizontal deflection system, care must be exercised in order to prevent "S-ing" a distortion which is manifested by a waviness in the sides of the raster. Filter circuits and full-wave rectification can be employed to reduce horizontal rate ripple in the rectified current but, obviously, such expedients add cost to the centering circuitry.

SUMMARY OF THE INVENTION

It is therefore a general object of the invention to provide an improved raster centering circuit for a television receiver.

It is a specific object of the invention to provide an efficient inexpensive horizontal centering circuit for a television receiver.

It is likewise a specific object of the invention to provide an efficient and inexpensive vertical centering circuit for a television receiver.

It is another object of the invention to provide a single centering circuit for the horizontal and vertical deflection systems.

In accordance with the invention a raster centering circuit is provided for a television receiver having a deflection system which includes a pair of deflection coils for conjointly establishing a two-dimension raster on the display screen of the receiver's image reproducer. The centering circuit comprises means for generating a deflection signal having a trace component and a retrace component. A tuning circuit, which is included in deflection signal generating means, derives an alternating signal of a frequency higher than the frequency of the retrace component. Rectifying means, coupled to the tuning circuit, rectifies the alternating signal to develop a unidirectional current. A direct current connection is effected between one side of one of the deflection coils and one terminal of the rectifier means. Finally, means, including an adjustable impedance, is provided for effecting a direct current connection between a second terminal of the rectifier and the other side of the aforesaid one coil to complete a direct current circuit between the rectifier and the coil and for causing a portion of the unidirectional current to flow through the one coil to center the raster in the dimension established by that coil.

BRIEF DESCRIPTION OF THE DRAWING

The features of the present invention which are believed to be novel are set forth with particularity in the appended claims. The invention, together with further objects and advantages thereof, may best be understood by reference to the following description taken in conjunction with the accompanying drawing, in the several FIGURES of which like reference numerals identify like elements, and in which the single FIGURE is a schematic representation, partially in block diagram form, of a television receiver embodying a centering circuit constructed in accordance with the invention.

DESCRIPTION OF THE PREFERRED EMBODIMENT

With the exception of a raster centering circuit, which will be subsequently described, the depicted television receiver is conventional in design and therefore only a brief description of its structure and operation is deemed necessary. A received signal intercepted by antenna 10 is coupled to television receiver circuits 11 which include the usual signal translating, heterodyning and IF amplifier circuits for deriving a composite video signal from the received television transmission. Circuits 11 also include luminance and chrominance signal processing circuits for supplying luminance and chrominance signals, respectively, to the cathodes 12 and control electrodes 13 of the electron beam forming and directing means included in the neck portion of a color reproducing cathode ray tube 14 for developing a trio of scanning electron beams.

The output of the IF amplifier in receiver circuits 11 is applied to a sound and sync detector 15 which develops a video signal that includes both sound and synchronizing components. The sound components are applied to audio circuits 16 wherein conventional sound demodulation and amplification circuitry develops an audio output signal suitable for driving a loudspeaker 17.

Synchronizing signals, in the form of horizontal and vertical sync pulses are derived from the output of detector 15 by a sync signal separator 18 and applied to horizontal and vertical deflection systems 19, 20 respectively, which systems utilize these pulses to generate horizontal and vertical sawtooth scanning signals for driving a deflection yoke 21 which is mounted upon the neck of cathode ray tube 14 adjacent the funnel portion. Yoke 21 comprises respective horizontal and vertical deflection coils 22, 23 which, when energized, conjointly deflect the electron beams in mutually perpendicular directions to establish a two-dimension raster on the display screen 24 of tube 14.

Since the invention is addressed to a raster centering arrangement, only so much of the horizontal and vertical deflection systems as are required to illustrate the invention are shown. Turning now to a more detailed consideration of the horizontal deflection system 19, this system is seen to comprise a driver 25, which serves as a source of switching or gating pulses, and an output stage comprising a switch in the form of an NPN transistor $Q_1$ and an output transformer 26. The input or base electrode of transistor $Q_1$ is coupled to driver 25, its emitter is maintained at reference potential and the collector electrode is returned to reference potential through the parallel combination of a damper diode $D_1$ and an energy storage capacitor 27. The collector is also connected to a source of B+ via the primary winding 28 of output transformer 26. Transformer 26, together with transistor $Q_1$, diode $D_1$ and deflection coil 22, comprises means for generating a horizontal deflection signal having a trace component and a retrace component. The retrace component is a voltage pulse, which is induced across the transformer primary when the trace or scanning current through deflection coil 22 is interrupted. The retrace component of the deflection signal will oscillate at a frequency determined, principally, by the inductance of the deflection coil and capacitor 27. This oscillation, however, is arrested after about one-half cycle by diode $D_1$ so that the resulting retrace pulse approximates a half-wave sinusoid. Since the scanning standards adopted for U.S. television transmissions allocate approximately 11.3 microseconds for horizontal retrace, the parameters of deflection coil 22 and capacitor 27 are selected so that they resonate at a frequency having an 11.3 microsecond half-wave period, which period corresponds to a characterizing frequency of approximately 44.2 KHz.

The horizontal deflection coil 22 is coupled in series with emitter-collector path of transistor $Q_1$ by a capacitor 32 and an additional winding 33 of output transformer 26. Winding 33 serves to match the impedance of deflection coil 22 to primary 28 of the transformer.

The horizontal deflection system further includes a high voltage circuit comprising the tertiary winding 35 of the output transformer and a high voltage rectifier 36. Tertiary 35, which serves to step-up and apply retrace pulses to rectifier 36, is coupled to the primary of the output transformer by a link winding 37. This winding has one terminal connected to the juncture of windings 28 and 33 and its other terminal connected to the other end of primary 28 through a tuning circuit comprising a capacitor 38 and an adjustable inductor 39 arranged in parallel. If desired, this tuning circuit can, of course, comprise a fixed inductor and an adjustable capacitor.

It is in the nature of horizontal deflection systems, of the type herein considered, that the energy present in the leakage inductance of the output transformer, at the instant the output device cuts off, causes a high frequency ringing to be set up. This ringing can produce a raster distortion which manifests itself as alternating light and dark vertical bars at one side of the raster. The ringing frequency is determined by the leakage inductance between the tertiary and the other windings of the transformer, principally the primary, and the capacity across the tertiary winding.

It is known to resolve this ringing problem by adjusting the coupling between the tertiary and the primary so that the leakage inductance is tuned to an odd harmonic of the 44.2 KHz individual retrace pulse frequency. By selecting an odd harmonic of the individual retrace pulse frequency as the frequency of the ringing signal, the harmonic can be phased to the retrace fundamental so that ringing during trace time is substantially eliminated. This cancellation of ringing obtains by virtue of the fact that an odd harmonic can be phased to its fundamental so that its excursion through zero occurs at the same time that its fundamental goes through zero. Accordingly, in the situation herein considered, the individual retrace pulse fundamental frequency and its in-phase odd harmonics are arranged to go through zero at the instant diode $D_1$ is rendered conductive, i.e., performs its clamping function. In this manner, the energy remaining in the ringing signal is dissipated.

In the case where the frequency of the ringing signal is adjusted to the fifth harmonic of the retrace pulse, it combines additively with the retrace to provide a broadened tertiary pulse while, at the same time, adding energy to that pulse, thus improving the regulation of the high voltage circuit. The resultant tertiary pulse is shown in the drawing, adjacent winding 35, in solid-line waveform Absent the contribution of the ringing signal, the tertiary pulse would have the peaked waveform shown by the dotted-line construction.

Tuning circuit 38, 39 comprises a means for achieving the requisite inductive and capacitive coupling between primary 27 and tertiary 35 so that the leakage inductance of the transformer and the capacity of the tertiary are tuned to an odd harmonic of the individual retrace pulse frequency, preferably the fifth harmonic or 221 KHz. Insofar as its tuning function is concerned, coil 39 and capacitor 38 constitute an independent resonant circuit and, insofar as its role as an energy source for the raster centering circuit is concerned, the actual frequency at which it resonates is immaterial as long as it is substantially higher than the characteristic frequencies of the trace and retrace components.

In practice circuit 38, 39 is adjusted until the pulse across the tertiary is observed, as by an oscilloscope, to have the desired fifth harmonic component superimposed thereon. In that situation circuit 38, 39 will actually be found to be resonating at a frequency somewhat lower than the fifth harmonic, approximately 190 KHz. Thus circuit 38, 39 resonates at a frequency just below the harmonic to which the leakage inductance is tuned which, in any event, is substantially higher than the characteristic frequencies of the horizontal trace and retrace components. It is appreciated, of course, that the horizontal deflection circuit can be designed to permit "tuning" of the transformer at an odd harmonic of the retrace pulse other than the fifth.

A rectifier circuit coupled to tuned circuit 38, 39 comprises a coil 42 disposed in inductive coupling relation to inductor 39, a diode device 43 and a pair of adjustable potentiometers 44, 45. Coil 42, diode 43 and the resistive portions of the potentiometers are connected in a series arrangement with the cathode of diode 43 connected to coil 42. This configuration, of course, is not critical since the diode may be reversed without affecting the performance of the circuit.

Means are provided for effecting a direct current connection between one side of horizontal deflection coil 22 and one terminal of the rectifier circuit. Specifically, an inductor 47 comprising a winding on output transformer 26 and having approximately the same number of turns as primary 28 and impedance matching winding 33 combined, is connected between the high AC potential terminal of deflection coil 22 and the junction of coil 42 and control 44. Additional means, including the adjustable tap of potentiometer 44 and a conductor 48, effect a direct current connection between another terminal of the rectifier circuit and the low AC potential side of deflection coil 22. In this fashion a direct current circuit between rectifier 43 and deflection coil 22 is completed to permit a portion of the unidirectional current developed by the rectifier to flow in a selectable direction through coil 22.

Insofar as the vertical deflection circuit is concerned, again only the significant portions of that stage, as they relate to the subject invention, are illustrated. More particularly, vertical deflection system 20 is seen to comprise an output transformer 50 having a primary winding 51, which is energized by a vertical output device, not shown, and a secondary winding comprising a pair of bifilar wound coils 52, 53, the common junction of which is connected to one terminal of the vertical deflection coil 23. Deflection coil 23, as well as the bifilar windings 52, 53 are arranged in a DC circuit configuration with the rectifier circuit 42–45. Specifically, a DC connection is effected between the upper side of deflection coil 23, as viewed in the drawing, and one terminal of the rectifier circuit by bifilar winding 53 and a conductor 54. A DC connection is also effected between the lower terminal of deflection coil 23 and the rectifier circuit by virtue of a conductor 55 and the adjustable tap of potentiometer 45. The particular DC circuit above described will cause a portion of the rectified current to flow through deflection coil 23 in a predetermined direction. Current flow in the opposite direction is afforded by an additional DC connection comprising bifilar winding 52 and conductor 56.

In operation, horizontal deflection system 19 generates, in a known fashion, a sawtooth deflection signal having a trace component and a retrace component. More particularly, the application of a positive gating pulse to the base of transistor $Q_1$, at time $t_1$, renders that device conductive thereby energizing transformer 26. The transformer, in turn, causes a positively increasing sweep current to flow through deflection coil 22. At the completion of this positive trace portion, time $t_2$, the transistor is switched off by a negative pulse and the sweep current flows into capacitor 27 developing a positive retrace pulse, as shown in the drawing, across the capacitor which pulse also appears across the transformer primary. After the retrace pulse peaks, the charge in capacitor 27 flows back into the transformer. At the completion of its positive excursion, time $t_3$, the retrace pulse is prevented from swinging negative by virtue of the clamping action of diode $D_1$. The transformer then drives a sweep current through the deflection coil in a reverse direction. From time $t_3$ to $t_4$ this reverse current decays linearly from a negative peak to zero at which time transistor $Q_1$ is again switched on to repeat the scanning process.

As described previously a high frequency ring, attributable to leakage inductance, is superimposed upon the retrace pulse, whenever $Q_1$ is cut off and its frequency is adjustable by tuning circuit 38, 39. Also, as noted above, this tuning action produces a high frequency alternating voltage across circuit 38, 39.

Accordingly, with circuit 38, 39 tuned to a frequency substantially higher than the individual horizontal retrace pulse frequency, coil 42 extracts a high frequency alternating signal from circuit 38, 39 and applies it to rectifier 43. The resulting DC centering current that flows in circuit 42–45 produces voltages across potentiometers 44 and 45 having the polarities shown in the drawing and characterized by a ripple that is significantly higher in frequency than the characteristic frequencies of either the horizontal deflection or retrace signals. As a result the centering current requires no filtering, other than that provided by the inherent inductance and capacitance of the deflection coil, prior to its application to the horizontal or vertical deflection coils. Accordingly, no distortion, attributable to ripple in the centering current, is produced in the raster.

In order to center the raster in a particular dimension it is required to pass a DC current in a selected direction through the deflection coil which establishes that dimension of the raster. More particularly, to center the raster horizontally the tap on potentiometer 44 is adjusted to the left or to the right. Assume that when the tap of potentiometer 44 is displaced to the left of center, as viewed in the drawing, the raster is likewise displaced. Accordingly, moving the tap to the left causes a DC current, which is depicted by solid line arrows, to flow from the tap upwards through conductor 48, to the left through deflection coil 22 and back to the other side of control 44 through transformer primary 28. This current produces a field in the deflection coil that reacts upon the electron beams to displace the raster horizontally to the left. To shift the raster horizontally to the right, on the other hand, the tap of control 44 is moved to the right of center which causes a DC current, illustrated by broken-line arrows, to flow upward through winding 47, to the right through deflection coil 22, downward through conductor 48 and return to the tap. Since this adjustment of potentiometer 44 produces current through deflection coil 22 in the opposite direction the raster is now displaced to the right.

In order to shift the raster vertically a DC current is caused to flow through the vertical deflection coil 23 in a selectable direction. Turning now to potentiometer 45 and assuming a movement of the adjustable tap to the left displaces the raster vertically upwards, the DC current resulting from that adjustment, shown by solid line arrows in the drawing, flows outward from the tap through conductor 55, upward through vertical deflection coil 23 and downward through bifilar winding 53 and, via conductor 54, to the negative terminal of potentiometer 45.

To displace the raster vertically in the opposite direction, i.e. downward, the tap of potentiometer 45 is moved to the right of its center position thereby causing a DC current, which is indicated by broken-line arrows, to flow down conductor 56, upward through bifilar winding 52, down through deflection coil 23 back to the tap on potentiometer 45 through conductor 55.

Accordingly, there has been shown and described a raster centering circuit comprising a rectifier for developing a unidirectional current from an alternating signal derived from a circuit utilized to tune the horizontal output transformer. By virtue of a single diode and a pair of potentiometers a horizontal, as well as a vertical centering circuit is provided for a television receiver. It is appreciated, of course, that the subject invention has equal utility in a single dimension centering application. That is, the described centering circuit can be used solely for horizontal centering if vertical centering is not required or desired. In that situation potentiometer 45 is removed and the positive terminal of potentiometer 44 is connected directly to the cathode of diode 43. By the same token, if horizontal centering is deemed unnecessary the circuit is equally useful solely as a vertical centering circuit by removing potentiometer 44 and returning the negative terminal of potentiometer 45 to the anode of diode 43 through coil 42.

While particular embodiments of the invention have been shown and described, modifications may be made, and it is intended in the appended claims to cover all such modifications as may fall within the true spirit and scope of the invention.

I claim

1. In a television receiver having a deflection system which includes first and second deflection coils for conjointly establishing a two-dimension raster on the display screen of the image reproducer of said receiver, a circuit for centering said raster with respect to at least one of said dimensions comprising:

- means for generating a deflection signal having a trace component and a retrace component;
- a tuning circuit, included in said deflection signal generating means, for deriving an alternating signal of a frequency higher than the characterizing frequency of an individual retrace component;
- rectifying means, coupled to said tuning circuit, for rectifying said alternating signal to develop a unidirectional current:
- means for effecting a direct current connection between one side of one of said deflection coils and one terminal of said rectifying means:
- and means, including an adjustable impedance for effecting a direct current connection between a second terminal of said rectifying means and the other side of said one coil to complete a direct current circuit between said rectifying means and said one coil and for causing a portion of said unidirectional current to flow through said one coil in a selectable direction to center said raster in the dimension established by said one coil.

2. A centering circuit as set forth in claim 1 in which said rectifying means comprises a single diode.

3. A centering circuit as set forth in claim 1 in which said one coil is a horizontal deflection coil.

4. A centering circuit as set forth in claim 1 in which said one coil is a vertical deflection coil.

5. A centering circuit as set forth in claim 1 in which said deflection signal generating means comprises a transformer and said tuning circuit is adjustable for tuning the leakage inductance of said transformer to an odd harmonic of said characterizing frequency.

6. A centering circuit as set forth in claim 5 in which said tuning circuit comprises a parallel arrangement of a capacitor and an inductor, which circuit is adjustable to tune said leakage inductance to the fifth harmonic of said characterizing frequency.

7. A centering circuit as set forth in claim 1 in which said adjustable impedance comprises a potentiometer having an adjustable tap included in the direct current connection between said second terminal of said rectifying means and said one deflection coil.

8. A centering circuit as set forth in claim 1 comprising additional means, including a second adjustable impedance, forming a direct current circuit between said rectifier means and the other of said deflection coils to permit flow of said unidirectional current through the other of said coils in a selectable direction to center said raster in the dimension established by said other coil.

9. A deflection system for a television receiver having a pair of deflection coils for conjointly establishing a two-dimension raster on the display screen of the image reproducer of said receiver, said system comprising:

- a transformer having a primary winding for applying to one of said deflection coils a deflection signal having a trace component,
- said transformer further having a tertiary winding included in a high voltage generating circuit;
- means, including said one deflection coil, for deriving individual retrace pulses each having a predetermined characterizing frequency;
- means, including a tuning circuit, for effecting optimum coupling between said primary and tertiary windings by tuning the leakage inductance between said primary and said tertiary winding to resonate the capacitance of said high voltage circuit at a frequency which is an odd harmonic of said predetermined characterizing frequency;
- and a raster centering circuit comprising rectifying means, coupled to said tuning circuit, for rectifying the alternating signal developed across said tuning circuit to derive a unidirectional current;
- means for effecting a direct current connection between one side of one of said deflection coils and one terminal of said rectifying means;
- and means, including an adjustable impedance, for effecting a direct current connection between a second terminal of said rectifying means and the other side of said one coil to complete a direct current circuit between said rectifying means and said one coil and for causing a portion of said unidirectional current to flow through said one coil in a selectable direction to center said raster in the dimension established by said one coil.

* * * * *